US011518084B2

(12) United States Patent
Schweizer et al.

(10) Patent No.: US 11,518,084 B2
(45) Date of Patent: Dec. 6, 2022

(54) DEVICE FOR THE ADDITIVE MANUFACTURE OF THREE-DIMENSIONAL WORKPIECES, AND METHOD FOR OPERATING A DEVICE FOR THE ADDITIVE MANUFACTURE OF THREE-DIMENSIONAL WORKPIECES

(71) Applicant: Robert Bosch GmbH, Stuttgart (DE)

(72) Inventors: Benjamin Schweizer, Horb (DE); Eberhard Maier, Koengen (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 16/769,888

(22) PCT Filed: Oct. 15, 2018

(86) PCT No.: PCT/EP2018/078035
§ 371 (c)(1),
(2) Date: Jun. 4, 2020

(87) PCT Pub. No.: WO2019/110170
PCT Pub. Date: Jun. 13, 2019

(65) Prior Publication Data
US 2021/0162651 A1 Jun. 3, 2021

(30) Foreign Application Priority Data
Dec. 7, 2017 (DE) ...................... 10 2017 222 162.3

(51) Int. Cl.
*B29C 64/112* (2017.01)
*B29C 64/118* (2017.01)
(Continued)

(52) U.S. Cl.
CPC ............ *B29C 64/112* (2017.08); *B22F 10/22* (2021.01); *B22F 12/00* (2021.01); *B29C 64/118* (2017.08);
(Continued)

(58) Field of Classification Search
CPC ...... B22F 10/22; B22F 12/00; B22F 2201/10; B22F 12/10; B22F 12/20; B22F 12/53;
(Continued)

(56) References Cited

U.S. PATENT DOCUMENTS

| 2009/0219319 A1 | 9/2009 | Houben |
| 2013/0004359 A1 | 1/2013 | Hosek |
| 2017/0087632 A1 | 3/2017 | Mark |

FOREIGN PATENT DOCUMENTS

| CN | 103056367 A | | 4/2013 |
| CN | 105945285 A | * | 9/2016 |

(Continued)

OTHER PUBLICATIONS

Machine Translation of CN105945285A (Year: 2016).*
(Continued)

*Primary Examiner* — Anthony J Zimmer
*Assistant Examiner* — Nazmun Nahar Shams
(74) *Attorney, Agent, or Firm* — Michael Best & Friedrich LLP

(57) ABSTRACT

The invention relates to a device (100) for the additive manufacture of three-dimensional workpieces, in particular a 3D metal printer, comprising a print head (1) and a device (40) for generating an inert atmosphere (22) within the print head (1) by means of a gas (55), in particular inert gas, wherein the print head (1) comprises a housing (3), a device (28) for feeding a metal (14), a piston (5), a reservoir (7) with an outlet opening (10) and an actuator device (12) for displacing the piston (5), wherein the reservoir (7) has a melt region (20) and a displacement body chamber (21) for a liquid phase (8) of the metal (14), wherein the melt region (20) adjoins the inert atmosphere (22) and is connected to the displacement body chamber (21) such that, as a result of the displacement of the piston (5), the liquid phase (8) of the (Continued)

metal (14) can be caused to pass through the outlet opening (10). The invention is distinguished by the fact that the device (40) for generating the inert atmosphere (22) is arranged outside the print head (1), wherein said device comprises an accumulator (41), at least one means (42, 43) for pressure control, and a gas line (50, 51, 52). The invention furthermore relates to methods for operating the device (100).

8 Claims, 1 Drawing Sheet

(51) Int. Cl.
  *B29C 64/209* (2017.01)
  *B29C 64/371* (2017.01)
  *B22F 10/22* (2021.01)
  *B22F 12/00* (2021.01)
  *B33Y 10/00* (2015.01)
  *B33Y 30/00* (2015.01)

(52) U.S. Cl.
  CPC .......... *B29C 64/209* (2017.08); *B29C 64/371* (2017.08); *B22F 2201/10* (2013.01); *B33Y 10/00* (2014.12); *B33Y 30/00* (2014.12)

(58) Field of Classification Search
  CPC .......... B22F 12/90; B22F 10/32; B22F 12/70; B22F 2999/00; B22F 3/115; B29C 64/112; B29C 64/118; B29C 64/209; B29C 64/371; B33Y 10/00; B33Y 30/00; Y02P 10/25
  See application file for complete search history.

(56) References Cited

FOREIGN PATENT DOCUMENTS

| CN | 106424735 A | 2/2017 |
| DE | 102016224047 | 6/2018 |
| GN | 105945285 | 9/2016 |

OTHER PUBLICATIONS

English machine translation of Wang et al. CN-105945285-A (Year: 2016).*

Taik-Min Lee et.al. "Drop-on-Demand Solder Droplet Jetting System for Fabricating Microstructure", IEEE Transactions On Electronics Packaging Manufacturing, vol. 31, No. 3, Jul. 2008 (Year: 2008).*

International Search Report for Application No. PCT/EP2018/078035 dated Jan. 22, 2019 (English Translation, 2 pages).

Taik-Min, L. et al., "Drop-on-Demand Solder Droplet Jetting System for Fabricating Microstructure," IEEE Transactions on Electronics Packaging Manufacturing, IEEE, Piscataway, NY, US, vol. 31, No. 3, Jul. 1, 2008, pp. 202-210.

* cited by examiner

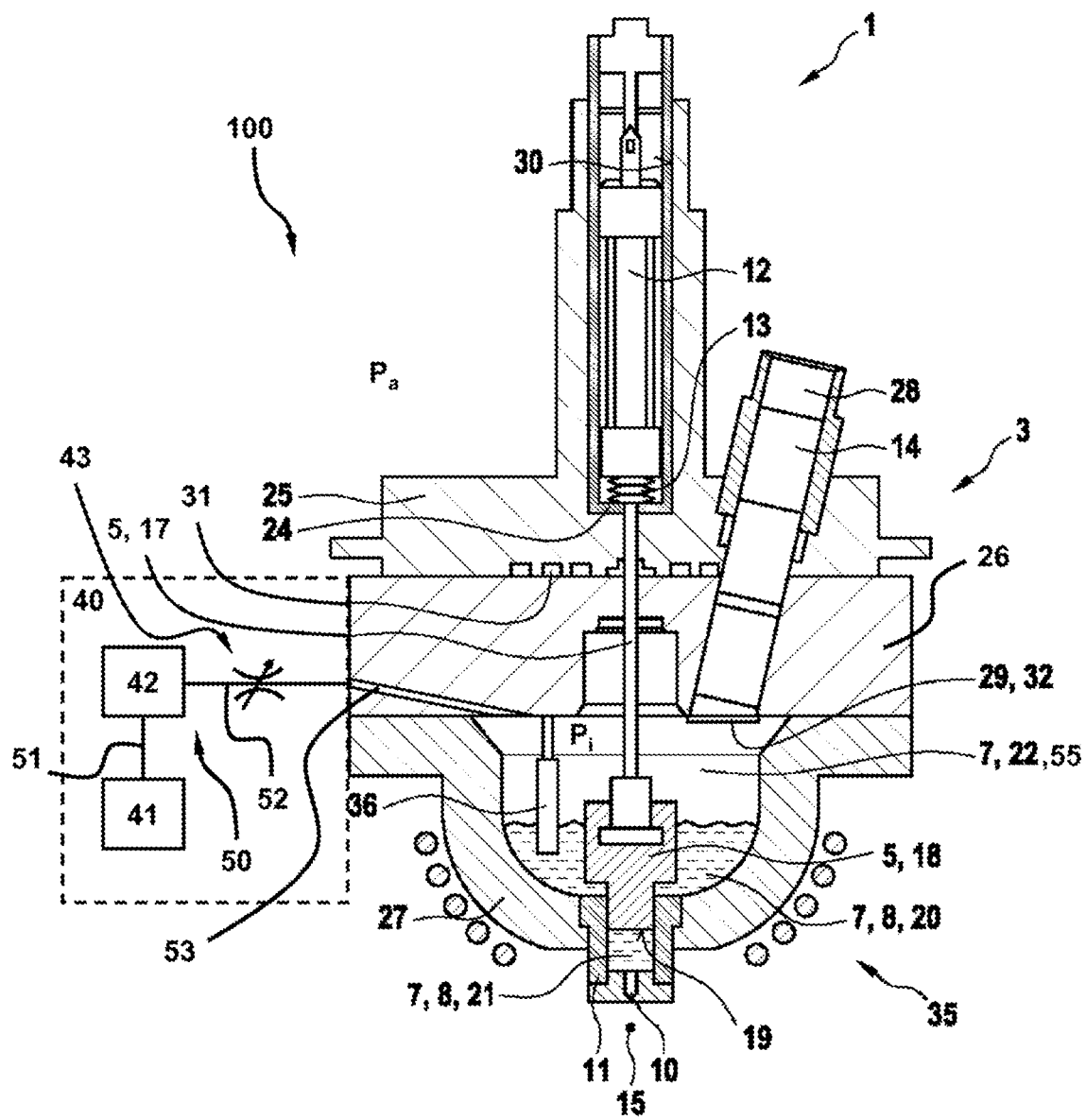

DEVICE FOR THE ADDITIVE MANUFACTURE OF THREE-DIMENSIONAL WORKPIECES, AND METHOD FOR OPERATING A DEVICE FOR THE ADDITIVE MANUFACTURE OF THREE-DIMENSIONAL WORKPIECES

BACKGROUND

The invention relates to an apparatus for additive manufacture of three-dimensional workpieces, especially a 3D metal printer, and to a method of operating an apparatus for additive manufacture of three-dimensional workpieces.

In a multitude of manufacturing methods, for example 3D printing or metal inert gas welding, comparatively unreactive or chemically inert gases are used to prevent an unwanted reaction of an oxidation-sensitive material, especially a metal, with atmospheric oxygen. Customary gases usable as inert gases are, for example, nitrogen, argon, helium, carbon dioxide or mixtures of these. An inert gas may accordingly be either a gas or a gas mixture. The inert gas is typically stored in external tanks or bottles and supplied via a 2/2-way valve.

DE102016224047, which was yet to be published at the date of this application, discloses a printhead for a 3D printer, especially metal printer, comprising a housing, an apparatus for supply of a metal, a piston, a reservoir with an exit orifice, and an actuator device for moving the piston.

It is a feature of this document that the reservoir has a melt region and a displacement chamber for a liquid phase of the metal, wherein the melt region adjoins an inert atmosphere and is connected to the displacement chamber in such a way that the movement of the piston can induce the liquid phase of the metal to pass through the exit orifice.

Compared to thermoplastics, metals have a significantly higher melting point and simultaneously a significantly lower viscosity in the liquid state, as a result of which the actuator pulses needed to generate droplets are energy-intensive. The establishment of the inert atmosphere is not described in detail.

SUMMARY

It is an object of the invention to provide an apparatus for additive manufacture of three-dimensional workpieces and methods of operating an apparatus for additive manufacture of three-dimensional workpieces that reduce the energy needed for the actuator pulses, enable a stable printing process and increase the lifetime of the printhead.

The object is achieved by the apparatus for additive manufacture of three-dimensional workpieces, and by the methods of operating a printhead.

The apparatus of the invention for additive manufacture of three-dimensional workpieces, especially a 3D metal printer, comprises a printhead and an apparatus for generating an inert atmosphere within the printhead by means of a gas, wherein the printhead comprises a housing, an apparatus for supply of a metal, a piston, a reservoir having an exit orifice and an actuator apparatus for moving the piston, wherein the reservoir has a melt region and a displacement chamber for a liquid phase of the metal, wherein the melt region adjoins the inert atmosphere and is connected to the displacement chamber in such a way that the movement of the piston can induce the liquid phase of the metal to pass through the exit orifice, wherein the apparatus for generating an inert atmosphere is disposed outside the printhead, wherein it comprises a storage means, at least one means of pressure control, and a gas conduit.

The apparatus for supply of the metal ensures easy supply of the material, as a result of which material can be replenished as required and the printhead is usable industrially, for example, as a result. Moreover, for example after emptying of the reservoir, an other suitable material can be supplied.

The melt region adjoins the inert atmosphere. This ensures that the pressure of the inert atmosphere is exerted directly on the melt, which can optimize the print quality. Moreover, the inert atmosphere advantageously ensures that no unwanted chemical reaction, for example oxidation of the melt, takes place in the reservoir. For example, the inert atmosphere may be formed from nitrogen or another gas, or inert gas.

The reservoir comprises the melting region for melting of the metal, which adjoins the inert atmosphere, and additionally the displacement chamber. This makes it possible to spatially separate the melting operation from the displacement or printing operation, which improves the reproducibility of the droplets, or of a component. The liquid phase of the metal present in the displacement chamber can be caused to pass through the exit orifice by the displacement of the piston. The melt or liquid phase of the metal passes from the melt region to the displacement chamber either under gravity or by virtue of a combination of gravity and the pressure of the inert gas. The exit orifice corresponds to a nozzle and is exchangeable according to the reservoir setup.

The apparatus for generation of the inert atmosphere is disposed outside the printhead, as a result of which the storage means, the at least one means of pressure control and the fluid connection can be spatially separated from the printhead, and the components are advantageously not exposed directly to the temperature of the printhead and the components are not heated as a result.

The actuator device is preferably formed by a piezoelectric actuator. Such an actuator reacts very quickly to electrical actuation with a change in length. It can exert a great force of up to several hundreds of newtons. The maximum stroke is typically in the order of magnitude of 50-80 µm. An actuation concept by means of piezoelectric actuator advantageously enables very exact reproduceability of the droplets. Moreover, the size of the droplets is controllable in a flexible manner with a uniform nozzle diameter. Very high frequencies (of up to 1000 Hz for example) are achievable with the piezoelectric actuator, which enables a very high build rate of the desired 3D structure. Moreover, the whole setup is automatable.

In one development, the gas conduit of the apparatus for generating the inert atmosphere is connected to the reservoir via a conduit, wherein the conduit is disposed within an insulation plate of the printhead.

The insulation plate is advantageously formed from a heat-insulating material and is designed such that it reduces heat transfer from the reservoir to a cooling flange. The use of the insulation plate enables suitable temperature management and sustained operation of the printhead. Moreover, the insulation reduces the energy input and simplifies the temperature control of the printhead. The insulation plate is formed, for example, from a ceramic having low thermal conductivity, for example zirconia. Also usable are porous ceramics or, for example, silicate ceramics.

In a preferred development, the inert atmosphere within the reservoir has a higher pressure than the ambient pressure outside the printhead, wherein the pressure is controllable by the at least one means of pressure control. The elevated pressure within the reservoir relative to the ambient pressure advantageously ensures a homogeneous pressure on the liquid phase of the metal, or the melt, which assists the printing process of the piston, or reduces the piston pressure needed to generate droplets. This advantageously reduces the mechanical load on the piston and, moreover, less energy is required for generation of a stroke. The defined elevated pressure on the melt, especially metal melt, reduces the energy needed in the actuator pulse. An additional advantage is that a defined elevated pressure in the pressure chamber can influence the amount of the liquid phase of the metal detached, or the droplet size and amount.

In developments, the means of pressure control is formed from a pressure control valve and/or a controllable throttle. According to the application, it is advantageous to use an electrical pressure control valve or an electrically controllable throttle.

In a first proposed method of operating an apparatus for additive manufacture of three-dimensional workpieces, especially during a printing operation by emitting individual droplets, according to the invention, the pressure of the inert atmosphere is controlled by the means of pressure control in such a way that the pressure of the inert atmosphere is above the ambient pressure and below a limiting pressure that causes emission of droplets through the exit orifice of the printhead.

The higher pressure of the inert atmosphere relative to the ambient pressure offers pressure assistance for the piston, which advantageously reduces the energy expenditure for implementation of the piston stroke and stabilizes the printing process. In an advantageous manner, the pressure is below the limiting pressure that would cause emission of droplets from the exit orifice without the piston performing a stroke. This ensures that droplets are emitted only when the piston is moved by the actuator.

In a second proposed method of operating an apparatus for additive manufacture of three-dimensional workpieces, especially during an operation of filling a workpiece, according to the invention, the pressure of the inert atmosphere is controlled by the means of pressure control in such a way that the pressure is above the ambient pressure and above the limiting pressure that causes emission of droplets through the exit orifice, such that the liquid phase of the metal is emitted through the exit orifice by virtue of the pressure exerted by the inert atmosphere.

The higher pressure of the inert atmosphere relative to the ambient pressure makes it possible for the printhead to generate a continuous expulsion of the liquid phase of the metal, or the melt, with the pressure of the inert atmosphere above the limiting pressure for expulsion of droplets, in such a way that the liquid phase of the metal, or the melt, is forced out of the exit orifice into a cavity of a workpiece. For this purpose, the piston stroke is interrupted. During the filling of the workpiece, the piston may be positioned either within or outside the melt. By virtue of this option, it is possible to very quickly fill regions in a workpiece, or in a 3D-printed part, which considerably minimizes the pressure time in an advantageous manner.

In a third proposed method of operating an apparatus for additive manufacture of three-dimensional workpieces, especially during a printing operation for production of a workpiece by emission of individual droplets and filling, the production of the workpiece by emission of individual droplets is accomplished by employing the method according to the invention, and the filling of a workpiece, especially a cavity of a workpiece, is accomplished by employing the method according to the invention.

The combination of the two methods of the invention advantageously enables a rapid build of a workpiece.

In a fourth proposed method of operating an apparatus for additive manufacture, especially during a printing operation for emission of a filament, according to the invention, the pressure of the inert atmosphere is controlled by the means of pressure control in such a way that the pressure is above the ambient pressure and above a limiting pressure that causes emission of droplets through the exit orifice.

The higher pressure of the inert atmosphere relative to the ambient pressure makes it possible for the printhead to generate a filament, with the pressure of the inert atmosphere above the limiting pressure for expulsion of droplets, in such a way that the liquid phase of the metal, or the melt, is forced continuously out of the exit orifice, such that a strand of the metal is formed after the melt has solidified. For this purpose, no additional piston stroke is necessary. During the production of the filament, this may be positioned either within or outside the melt.

In a fifth proposed method of operating an apparatus for additive manufacture of three-dimensional workpieces, especially during an operation of emptying the printhead, the pressure of the inert atmosphere is controlled by the means of pressure control in such a way that the pressure is above the ambient pressure and above the limiting pressure that causes emission of droplets through the exit orifice, such that the liquid phase of the metal is emitted through the exit orifice by virtue of the pressure exerted by the inert atmosphere, and the reservoir and the displacement chamber are purged by the gas.

The higher pressure of the inert atmosphere relative to the ambient pressure makes it possible for the melt to be very substantially removed from the printhead, with the pressure of the inert atmosphere above the limiting pressure for expulsion of droplets, in such a way that the liquid phase of the metal, or the melt, is forced continuously out of the exit orifice. For this purpose, no additional piston stroke is necessary. During the emptying operation, this should be positioned outside the melt in order that no residues of the liquid phase of the metal remain on the die.

The emptying of the printhead, or of the reservoir and the displacement chamber, takes place by purging of the melt still present in the printhead, preferably at the end of a printing operation, out of the printhead by introducing the inert gas into the printhead with an elevated pressure with respect to the ambient pressure of the printhead. This advantageously avoids stresses in the components of the printhead that come into contact with melt, which significantly increases the lifetime of the printhead.

Further measures that improve the invention are detailed below together with the description of the preferred working example of the invention with reference to the FIGURE.

BRIEF DESCRIPTION OF THE DRAWINGS

The FIGURE shows:
FIG. 1 a working example of the apparatus of the invention.

DETAILED DESCRIPTION

The FIGURE shows a working example of an apparatus 100 for additive manufacture of three-dimensional workpieces, especially a 3D metal printer.

The apparatus 100 comprises a printhead 1 and an apparatus 40 for generation of an inert atmosphere 22 within the printhead 1 by means of a gas 55, especially inert gas. The printhead 1 comprises a housing 3, an apparatus 28 for supply of a metal 14 in solid phase, a piston 5, a reservoir 7, 27 with an exit orifice 10, and an actuator apparatus 12 for movement of the piston. The reservoir 7, 27 has a melt region 20 and a displacement chamber 21 for a liquid phase 8 of the metal 14, with the melt region 20 adjoining the inert atmosphere 22 and connected to the displacement chamber 21 in such a way that the movement of the piston 5 can induce the liquid phase 8 of the metal 14 to pass through the exit orifice 10. The liquid phase 8 of the metal 14 is also referred to as melt 8, and the inert atmosphere 22 is formed by introduction of the inert gas 55 into the reservoir 7, 27. Introduction of the inert gas 55 preferably takes place via a cold region of the printhead 1 into the reservoir 7, 27.

The housing 3 is in multipart form, comprising at least a cooling flange 25, the insulation plate 26, and the reservoir 7, 27.

The apparatus 40 for generation of the inert atmosphere 22 is disposed outside the printhead 1, comprising a storage means 41, especially pressurized storage means for the gas 55, at least one means 42, 43 of pressure control, and a gas conduit 50, 51, 52. The means 42, 43 of pressure control, in the embodiment shown, are formed from an electrical pressure control valve 41 and an electrically controllable throttle 42. It is also possible to use either solely the electrical pressure control valve 42 or solely the electrically controllable throttle 43 for control of the pressure of the inert atmosphere 22 in the reservoir 7, or within the printhead.

Moreover, the gas conduit 50, 51, 52 of the apparatus 40 for generation of the inert atmosphere 22 is connected to the reservoir 7 via a conduit 53, with the conduit 53 disposed within the insulation plate 26 of the printhead 1. By means of connection adapters (not shown), the apparatus 40 for generation of the inert atmosphere 22 may be connected to the conduit 53 of the printhead 1 by means of the gas conduit 50, 51, 52 disposed outside the printhead 1. The conduit 53 within the insulation plate 26 is preferably designed as a passage hole.

The piston 5 has a multipart design, comprising at least one piston rod 17 made of a metallic material and a die 18 made of ceramic. The piston rod 17, proceeding from the actuator device 12, projects through the cooling flange 25 and the insulation plate 26 into the reservoir 7, 27, where it merges into the die 18.

The cooling flange 25 has a recess 30 to accommodate the actuator device 12 in the form of a piezoelectric actuator 12. During operation, the piezoelectric actuator 12 is fixed in the recess 30 in such a way that, on application of a voltage, it exerts a working stroke on the piston 5, specifically on the piston rod 17 of the piston. The piston rod 17 transmits the working stroke to the piston 18, such that it induces the liquid phase 8 of the metal 14 to pass through the exit orifice 10. Without actuation of the actuator 12, the piston 5 can be reset to a starting position by a spring 13, with the spring 13 disposed in the recess 30 of the cooling flange 25 between a shoulder 24 and the actuator 12. The spring 13 takes the form of a cup spring.

In addition, the cooling flange 25 has cooling channels 31 for cooling. The cooling channels 31 are disposed between the cooling flange 25 and the insulation plate 26, and a cooling medium flows through them. This serves as cooling against the heating by the melt 8 and for cooling of the actuator 12 in operation. The cooling flange 25 is formed from a metallic material.

The insulation plate 26 adjoining the cooling flange 25 on the side of the cooling channels 31 is formed from a heat-insulating material and is designed in such a way that it reduces heat transfer from the reservoir 7, 27 to the cooling flange 25.

The apparatus 28 for supply of the metal 14 opens into the reservoir 7, 27 and is disposed in the cooling flange 25 and the insulation plate 26. The apparatus 28 projects through the cooling flange 25 and the insulation plate 26, and the metal 14, or the material 14 to be printed, is suppliable through the apparatus 28 from the outside. It is possible with preference to use pre-dosed pieces of material, or pellets. At the transition of the insulation plate 26 to the reservoir 7, 27, there is an orifice 29 through which the material 14 enters the reservoir 7, 27. The opening 29 is closable by an apparatus 32, such that it is preferably open only when the material 14 is being supplied, which reduces the escape of energy, or gas, from the inert atmosphere 22.

The reservoir 7, 27 takes the form of a melt crucible 27, with an inductor 35 disposed outside the melt crucible 27 and a sensor 36, especially a temperature sensor, within the melt crucible. There may optionally be an insulator (not shown) between the melt crucible 27 and the inductor 35, or the inductor coil 35.

The metal 14 reaches the melting region 20 of the melt crucible in a solid phase 14 and is heated by the inductor 35 until it is converted to a liquid phase 8. On attainment of a desired process temperature of the melt 8, which is ascertained by the temperature sensor 36, the printhead 1 can commence operation. The liquid phase 8, or the melt 8, under gravity of the melt 8 or through a combination of gravity and atmospheric pressure of the inert gas 22, moves past the die 18 into the displacement chamber 21. The die 18 of the piston 5 is surrounded by a pressure side 19 in the melt 8, or by melt 8, and, on the connection side to the piston rod 17, surrounded in the inert atmosphere 22, or by the inert atmosphere 22. The piston rod 17 does not come into contact with the melt 8 by virtue of the process.

The ceramic of the die 18 advantageously has very good thermal conductivity, in order to be able to efficiently transfer the heat generated by the inductor 35 into the displacement chamber 21.

On actuation of the piezoelectric actuator 12, the pressure side 19 of the die 18 exerts a pressure on the melt 8 in the displacement chamber 21 in the direction of the exit orifice 10, and ensures expulsion of a droplet 15 through the exit orifice 10 of the reservoir 7, 27, or of the displacement chamber 21. The exit orifice 10 is designed for the expulsion of droplets 15 of the liquid phase 8 of the metal 14, the exit orifice 10 having the form of a nozzle 10 and being connectable in a fixed manner to the melt crucible 27, or, as shown in the working example, having an exchangeable insert 11 that permits the use of different nozzle geometries.

The inert atmosphere 22 within the reservoir 7 during operation is at a higher pressure $P_i$ than an ambient pressure $P_a$ outside the printhead 1, the pressure $P_i$ being controllable by the at least one means 42, 43 of pressure control.

The invention also covers methods of operating the apparatus 100 for additive manufacture.

In a first method, especially during a printing operation for production of a workpiece by emission of individual droplets 15, the pressure $P_i$ of the inert atmosphere 22 is controlled, or adjusted, by the means 42, 43 of pressure control in such a way that the pressure $P_i$ is above the ambient pressure $P_a$ and below a limiting pressure that causes, or would cause, emission of droplets 15 through the exit orifice 10. The higher pressure $P_i$ of the inert atmosphere 22 relative to the ambient pressure $P_a$ offers pressure assistance for the piston 5. The pressure $P_i$ here is below a limiting pressure that would cause expulsion of droplets 15 from the exit orifice 10 of the printhead 1 without the piston 5 performing a stroke, or a pressure pulse, on the melt 8. The pressure $P_i$ of the inert atmosphere 22 to be established by the means 42, 43 of pressure control is dependent, for example, on the metal 14 to be processed and the resulting viscosity of the melt 8. And also on the size of the exit orifice 10.

The pressure $P_i$ is adjusted such that droplets 15 are expelled only when the piston 5 is moved by the actuator 12.

In a second method, especially during an operation of filling a workpiece, the pressure $P_i$ of the inert atmosphere 22 is controlled, or adjusted, by the means 42, 43 of pressure control in such a way that the pressure $P_i$ is above the ambient pressure $P_a$ and above the limiting pressure that causes emission of droplets 15 through the exit orifice 10, such that the liquid phase 8 of the metal 14 is emitted through the exit orifice 10 by virtue of the pressure exerted by the inert atmosphere 22.

The higher pressure $P_i$ of the inert atmosphere relative to the ambient pressure $P_a$ makes it possible for the printhead 1 to generate a continuous expulsion of the liquid phase 8 of the metal 14, or of the melt 8, with the pressure $P_i$ of the inert atmosphere 22 above a limiting pressure for expulsion of droplets 15, in such a way that the liquid phase 8 of the metal 14, or the melt 8, can be forced out of the exit orifice 10 into a cavity of a workpiece. The stroke, or the pressure pulse, of the piston 5 on the melt 8 is interrupted for this operation. During the filling of the workpiece, the piston 15 may be positioned either within or outside the melt 8. This method enables very rapid filling of regions in a workpiece, or in a 3D-printed part, which can reduce the overall print time for a workpiece.

In a third method, especially during a printing operation for production of a workpiece by emission of individual droplets 15 and filling, the workpiece is produced by emission of individual droplets 15 by employing the first method, and the workpiece, especially a cavity of a workpiece, is filled by employing the second method.

The methods described above may be combined as desired during a printing operation.

In a fourth method, especially during a printing operation for emission of a filament, the pressure $P_i$ of the inert atmosphere 22 is controlled, or adjusted, by the means 42, 43 of pressure control such that the pressure $P_i$ is above the ambient pressure $P_a$ and above a limiting pressure that causes emission of droplets 15 through the exit orifice 10.

The higher pressure $P_i$ of the inert atmosphere 22 relative to the ambient pressure $P_a$ makes it possible for the printhead 1 to produce a filament, with the pressure $P_i$ of the inert atmosphere 22 above a limiting pressure for expulsion of droplets 15, in such a way that the liquid phase 8 of the metal 14, or the melt 8, is forced continuously out of the exit orifice 10 of the printhead 1, such that, after the setting of the melt, a filament, or a strand, is formed from the metal 14. No additional stroke of the piston 5 is necessary for this process. During the production of the filament, this may be positioned either within or outside the melt.

In a fifth method, especially during an operation of emptying the printhead 1, the pressure $P_i$ of the inert atmosphere 22 is controlled by the means 42, 43 of pressure control in such a way that the pressure $P_i$ is above the ambient pressure $P_a$ and above the limiting pressure that causes emission of droplets 15 through the exit orifice 10, such that the liquid phase 8 of the metal 14 is emitted through the exit orifice 10 by virtue of the pressure exerted by the inert atmosphere 22, with purging of reservoir 7 and the displacement chamber 21 by the gas 55.

The higher pressure $P_i$ of the inert atmosphere 22 relative to the ambient pressure $P_a$ makes it possible for the melt 8 to be very substantially removed from the printhead 1, with the pressure $P_i$ of the inert atmosphere 22 above a limiting pressure for expulsion of droplets 15, in such a way that the liquid phase 8 of the metal 14, or the melt 8, is forced continuously out of the exit orifice 10. For this purpose, no additional stroke of the piston 5 is necessary. During the emptying operation, this should be positioned outside the melt 8, so that no residues of the liquid phase 8 of the metal 14 adhere to the die 18 of the piston 5.

The emptying of the printhead 1, or of the reservoir 7 and the displacement chamber 21, takes place in that the melt 8 still present within the printhead 1, preferably at the end of a printing operation, is purged from the printhead 1, or the reservoir 7 and the displacement chamber 21, in that the inert gas 55 is introduced into the printhead with the pressure $P_i$, or the elevated pressure with respect to the ambient pressure $P_a$ of the printhead 1. As a result, during the cooling and setting of the melt 8, stresses that occur in the components of the printhead 1 that come into contact with the melt 8 are avoided.

The methods described above may be executed individually or successively in combination for operation of the apparatus 100 for additive manufacture.

What is claimed is:

1. A method of operating an apparatus (100) for additive manufacture of three-dimensional workpieces during a printing operation for production of a workpiece by emission of individual droplets (15) and filling, the apparatus comprising a printhead (1) and an apparatus (40) for generating an inert atmosphere (22) within the printhead (1) by means of a gas (55), wherein the printhead (1) comprises a housing (3), an apparatus (28) for supply of a metal (14), a piston (5), a reservoir (7) having an exit orifice (10) and an actuator apparatus (12) for moving the piston (5), wherein the reservoir (7) has a melt region (20) and a displacement chamber (21) for a liquid phase (8) of the metal (14), wherein the melt region (20) adjoins the inert atmosphere (22) and is connected to the displacement chamber (21) in such a way that the movement of the piston (5) can induce the liquid phase (8) of the metal (14) to pass through the exit orifice (10), wherein the apparatus (40) for generating the inert atmosphere (22) is disposed outside the printhead (1) and comprises a storage means (41), at least one means (42, 43) of pressure control, and a gas conduit (50, 51, 52), wherein the inert atmosphere (22) has a higher pressure ($P_i$) within the reservoir (7) than an ambient pressure ($P_a$) outside the printhead (1), wherein the pressure ($P_i$) is controllable by the at least one means (42, 43) of pressure control, the method comprising:

operating the apparatus (100) in a first operational mode in which the workpiece is produced by emission of individual droplets (15), the first operational mode being accomplished such that the pressure ($P_i$) of the inert atmosphere (22) is controlled by the means (42, 43) of pressure control in such a way that the pressure ($P_i$) is above the ambient pressure ($P_a$) and below a limiting pressure that causes emission of droplets (15) through the exit orifice (10), and operating the apparatus (100) in a second operational mode for filling of the workpiece, the second operational mode being accomplished such that the pressure ($P_i$) of the inert atmosphere (22) is controlled by the means (42, 43) of pressure control in such a way that the pressure ($P_i$) is above the ambient pressure ($P_a$) and above the limiting pressure that causes emission of droplets (15) through the exit orifice (10), such that the liquid phase (8) of the metal (14) is emitted through the exit orifice (10) by virtue of the pressure exerted by the inert atmosphere (22).

2. The method of claim 1, wherein the second operational mode is accomplished without operation of the piston (5).

3. The method of claim 2, wherein the first operational mode is accomplished with operation of the piston (5), wherein operation of the piston (5) includes a stroke or a pressure pulse of the piston (5).

4. The method of claim 3, wherein the piston (5) is moved by the actuator (12) in the first operational mode.

5. The method of claim 2, wherein the second operational mode includes removing the piston (5) from the displacement chamber (21).

6. The method of claim 2, wherein the second operational mode includes maintaining the piston (5) in the displacement chamber (21).

7. The method of claim 1, wherein the first operational mode is executed separately from the second operational mode.

8. The method of claim 1, wherein the first operational mode is executed successively with the second operational mode.

\* \* \* \* \*